(12) United States Patent
Coadic et al.

(10) Patent No.: US 10,608,898 B2
(45) Date of Patent: Mar. 31, 2020

(54) DYNAMIC METHOD FOR DETERMINING A LIST OF SERVICES IN AN SIP NETWORK

(71) Applicant: Orange, Paris (FR)

(72) Inventors: Thibaut Coadic, Paris (FR); Olivier Cleuziou, Ivry sur Seine (FR); Bruno Tossou, Montgeron (FR)

(73) Assignee: ORANGE, Paris (FR)

( * ) Notice: Subject to any disclaimer, the term of this patent is extended or adjusted under 35 U.S.C. 154(b) by 772 days.

(21) Appl. No.: 14/370,161

(22) PCT Filed: Dec. 13, 2012

(86) PCT No.: PCT/FR2012/052930
§ 371 (c)(1),
(2) Date: Mar. 23, 2015

(87) PCT Pub. No.: WO2013/102716
PCT Pub. Date: Jul. 11, 2013

(65) Prior Publication Data
US 2015/0229536 A1 Aug. 13, 2015

(30) Foreign Application Priority Data
Jan. 3, 2012 (FR) ...................................... 12 50050

(51) Int. Cl.
*G06F 15/173* (2006.01)
*H04L 12/24* (2006.01)
(Continued)

(52) U.S. Cl.
CPC ...... *H04L 41/5012* (2013.01); *H04L 65/1069* (2013.01); *H04L 67/16* (2013.01); *H04M 3/42136* (2013.01); *H04M 2207/203* (2013.01)

(58) Field of Classification Search
CPC .................. H04L 65/1006; H04L 65/1016
(Continued)

(56) References Cited

U.S. PATENT DOCUMENTS

2006/0098624 A1* 5/2006 Morgan ............ H04L 29/06027
370/352
2006/0256779 A1* 11/2006 Lim ................. H04L 29/06027
370/352
(Continued)

OTHER PUBLICATIONS

"Telecommunications and Internet Converged Services and Protocols for Advanced Networking (TISPAN); IMS-Based IPTV Stage 3 Specification", Technical Specification, European Telecommunications Standards Institute (ETSI), 650, Route Des Lucioles; F06921 Sophia-Antipolis; France, vol. TISPAN 3, No. V3.5.2, Mar. 1, 2011 (Mar. 1, 2011), XP014065520.

(Continued)

*Primary Examiner* — Wing F Chan
*Assistant Examiner* — Andrew Woo
(74) *Attorney, Agent, or Firm* — David D. Brush; Westman, Champlin & Koehler, P.A.

(57) ABSTRACT

A method is provided for determining a list of services for a user of a customer device of operator network implementing SIP. The method includes: the customer device inserts a list of services that it has the technical means to provide into a request for registration with the operator network; where appropriate, each intermediate network relating the customer device to the operator network transmits the request to the operator network after having deleted therefrom or marked, in the list of services, all services that the intermediate network does not have technical means to provide and/or for which the intermediate network does not have a use agreement with the operator of the upstream and/or downstream network to which it is connected; and the operator network obtains a definitive list by extracting services to which the user is entitled among the services that the operator network has the technical means to provide.

12 Claims, 2 Drawing Sheets

(51) Int. Cl.
*H04L 29/06* (2006.01)
*H04L 29/08* (2006.01)
*H04M 3/42* (2006.01)

(58) Field of Classification Search
USPC .......................................................... 709/223
See application file for complete search history.

(56) References Cited

U.S. PATENT DOCUMENTS

| | | | | |
|---|---|---|---|---|
| 2007/0076691 | A1* | 4/2007 | Varney | H04L 29/12188 |
| | | | | 370/352 |
| 2009/0093241 | A1* | 4/2009 | Kowalewski | H04L 65/1069 |
| | | | | 455/418 |
| 2010/0217837 | A1* | 8/2010 | Ansari | G06Q 30/04 |
| | | | | 709/218 |

OTHER PUBLICATIONS

Joachim Poetzl et al., "Extensions to the Session Initiation Protocol (SIP) for the Support of the Call Completion Services for the European Telecommunications Standards Institute; draft-poetzl-sipping-call-completion-02.txt", Feb. 1, 2007, No. 2, Feb. 1, 2007 (Feb. 1, 2007), XP015050311.

International Search Report and Written Opinion dated Feb. 5, 2013 for corresponding International Application No. PCT/FR2012/052930, filed Dec. 13, 2012.

English translation of Written Opinion dated Feb. 5, 2013 for corresponding International Application No. PCT/FR2012/052930, filed Dec. 13, 2012.

European Office Action dated Nov. 19, 2018 for corresponding European Application No. 12815740.1.

"3rd Generation Partnership Project; Technical Specification Group Services and System Aspects; IP Multimedia Subsystem (IMS); Stage 2 (Release 10)" 3GPP TS 23.228 V10.6.0 (Sep. 2011).

* cited by examiner

DYNAMIC METHOD FOR DETERMINING A LIST OF SERVICES IN AN SIP NETWORK

CROSS-REFERENCE TO RELATED APPLICATIONS

This application is a Section 371 National Stage Application of International Application No. PCT/FR2012/052930, filed Dec. 13, 2012, the content of which is incorporated herein by reference in its entirety, and published as WO 2013/102716 on Jul. 11, 2013, not in English.

FIELD OF THE DISCLOSURE

The present invention concerns telecommunication networks of IP ("Internet Protocol") type, and notably those among IP networks that are capable of implementing developed session control protocols. IP networks allow conversational data to be broadcast, within the framework of services such as "voice over IP" (VoIP), "Content Sharing" or "Instant Messaging".

More particularly, the present invention concerns the means that are set up in an IP network using the session control protocol SIP (initials for "Session Initiation Protocol" in English), denoted by "SIP network" below, in order to allow a user of this network to dynamically, that is to say during registration on the network or subsequently, find the services to which he effectively has access.

BACKGROUND OF THE DISCLOSURE

A customer device ("User Equipment" in English) is said to "belong" to the network of a given operator, called "operator network" below, when the user of this customer device has an account with this operator, whatever the access network used by the customer device to connect to the operator network. For example, these customer devices may be a fixed or mobile terminal, or a gateway at home ("Residential Gateway" in English) or situated in a company, or else a network operator gateway ("Voice Gateway" in English) such as a (DSLAM-SIP (DSLAM are the initials for "Digital Subscriber Line Access Multiplexer" in English; this is a device collecting the DSL data traffic that travels over a certain number of telephone lines).

The SIP protocol has been defined by the IETF in RFC document 3261. This protocol allows the setup, modification and termination of multimedia sessions in a network using the IP protocol. The SIP protocol has then been extended by the IETF in several other RFC documents, adding new functionalities to the SIP protocol.

The SIP protocol is used particularly in infrastructures of IMS (initials for "IP Multimedia Subsystem" in English) type. The IMS is defined by the standardization body 3GPP ("3rd Generation Partnership Project"). It is a network architecture introduced initially for mobile networks and then extended to other access means, including fixed access means using xDSL technology. This architecture allows dynamic setup, and control, of multimedia sessions between two customers and the reservation of resources at the level of the transport network for the multimedia streams. Owing to this architecture, network operators are conveniently able to implement a management policy, provide a predetermined Quality of Service and calculate the amounts to be invoiced to the customers. The IMS currently allows access to services of telephony, videophony and Presence and Instant Messaging type, of which it also manages the interaction.

When a user wishes to make use of the services provided by an IMS network, he sends the network signaling messages that may include notably various types of requests.

First of all, the customer device of the user must, allowing for exceptions (in the event of some emergency calls), register on the network. When the network is incapable of associating this registration with a preceding registration (for example following a network breakdown, or following stoppage of the customer device for a period longer than a predetermined value), the registration is considered to be an initial registration. After an initial registration, the customer device of the user must periodically send the network a request to confirm that it wishes to maintain its registration.

So as therefore to be able to register customer devices, IMS networks comprise one or more servers, generally called "S-CSCF" (initials for "Serving-Call Session Control Function" in English), which are capable (among other functions) of managing the registration procedure of the devices connected to the network.

Moreover, these networks comprise one or more servers, generally called "I-CSCF" (initials for "Interrogating-Call Session Control Function" in English)—which are furthermore often physically combined with the servers of S-CSCF type in order to constitute servers denoted by "I/S-CSCF"—which, at the moment of registration of a customer device, interrogate a server called "HSS" (initials for "Home Subscriber Service" in English) in order to be able to select an S-CSCF server having the features that are obligatorily (and, where appropriate, optionally) required in order to attain the level of service that the user subscribes to. HSS servers each contain a customer database, and are therefore equivalent in IMS networks to the "HLR" (initials for "Home Location Register" in English) servers used in GSM networks. Each HSS server contains the "profile" of a certain number of customer devices in the network, this profile comprising their registration state, authentication and location data and subscribed-to services.

Finally, at the periphery of the IMS network, there may be one or more IBCF (initials for "Interconnection Border Controller Function" in English) server(s): these are SIP servers situated on the border of the IMS network and implementing the specific processing operations that are necessary, where appropriate, in order to make an interconnection with another SIP network. This IBCF function is often performed by a piece of equipment of SBC (initials for "Session Border Controller" in English) or I-SBC type.

Within the framework of a network and of services using the session control protocol SIP, the choice of services to which a user can have access at a given instant is dependent on various factors.

Thus, this choice is dependent on the provision of services to which the user has subscribed. It is also dependent on the customer device used by the user and on the technical features thereof: this is because the customer device may give the misleading impression that it is able to call upon services to which the user is not in fact entitled, or conversely may not allow the user to use certain services to which he has nevertheless duly subscribed.

This choice is likewise dependent on the various intermediate networks used for associating the customer device and the operator network. For example, in a mobility situation, the access connectivity may be provided by a first network, for example a network local to the country visited by the user. Equally, this first network may not be directly connected to the operator network, so that the use of at least one supplementary transit network is necessary. In point of fact, each of these networks may have technical features of their own, and these networks may not all have the means to provide the services to which the user could have access if he were directly connected to his operator network. Even though these networks could individually have such means, it may be that the operators that manage them have not entered into the prior interconnection agreements that are necessary for end-to-end implementation of some of the technical features that are required for the user to be able to make full use of his offer of services.

There is a double stake in that the customer device of the user and the operator network are able to determine what services are effectively accessible to the user:

for the customer device, it is a matter of avoiding returning an erroneous piece of information to the user so as to prevent the latter from attempting to call upon services that will not be able to be honored, which would cause both unnecessary traffic in the network and a risk of incomprehension and dissatisfaction for the user;

for the operator network, it is a matter of avoiding addressing requests destined for failure to the customer device, which would cause unnecessary resource consumption.

This problem is illustrated in FIG. 1. In this figure, a user (denoted by "U" in the figure) has subscribed to the services S1, S2, S3, S4 and S5 with his service operator. The customer device (denoted by "T" in the figure) that he uses to connect to the network has the means for providing the services S2, S3, S4, S5 and S6. The user is on the move in a foreign country, and he uses the network of an operator that is local to the country that he is visiting (network denoted by "RI1" in the figure) as an intermediate network for connecting to the operator network (denoted by "RO" in the figure). RI1 has the means for providing the services S1, S3, S4, S5 and S6. In point of fact, RI1 does not have any direct connection to the operator network RO, and uses a transit network (denoted by "RI2" in the figure) to join the operator network RO. This intermediate network RI2 has the means for providing all the services S1, S2, S3, S4, S5 and S6, but the interconnection agreement between the intermediary RI2 and the operator network RO does not anticipate compatibility with the service S3. In the end, only S4 and S5 are accessible to the user U, but, on the basis of the compatibility indications provided by T, said user will think that the services S2, S3, S4, S5 and S6 are accessible to him, and risks a vain attempt to use the services S2, S3 and S6. Equally, the operator network RO will think that the services S2, S3, S4 and S5 are accessible, whereas sending requests relating to the services S2 and S3 to T will result in failure.

There are various methods in the prior art that allow a customer device to acquire information about the services that are accessible to it.

Thus, according to the standard TS 183 063 from the ETSI (European Telecommunications Standards Institute) (cf. notably section 5.3.1.1 and annex A.4.1), a user registered with an IMS network may present this network with a request for provision of services ("service packages and broadcast services") related to the reception of television channels via Internet (IPTV); the network authorizes the required services so far as they are compatible with the subscription of the user with the operator of the network, and the user is informed of what the network has authorized.

However, when an operator network agrees to provide such a service, it does not take account of any technical limitations that this operator network might itself bring, or, where appropriate, of the intermediate networks between it and the customer device of the user, so that, in unfavorable scenarios, the service will not be provided for the user after all despite the authorization given by the operator network.

Conversely, in the specific case of mobile access means standardized by the 3GPP ("3rd Generation Partnership Project"), provision is made (according to 3GPP standard TS 23.401) for, during the radio attachment, the visited network (that is to say the network used at a given instant by the customer device for providing its connectivity) to spontaneously indicate to the customer device that it is capable of providing the SIP/IMS voice service ("IMS voice over PS sessions" parameter) and the SIP/IMS emergency services ("Emergency Service Support" parameter). However, these provisions are limited to the services that have just been mentioned, whereas the user of the customer device might wish to know whether or not certain other services in which he has particular interest are accessible to him.

Still in the case of mobile access means, the operator of the user may likewise, according to 3GPP standard TS 24.167, configure the services that it provides and/or authorizes in the customer device. However, this is by definition a static provision: an update of this information on a registration session by registration session basis would be excessively onerous to implement; moreover, it presupposes the deployment of a configuration infrastructure, which is not guaranteed. Above all, this list of services does not take account of the possible limitations that might be entailed by the existence of intermediate networks.

It appears, in conclusion, that these known techniques, even combined with one another, are not capable of solving the problem overall. Notably, they do not make it possible to take account of the restrictions entailed by the use of an intermediate network that would be technically incapable of providing certain services, or that would not authorize certain services, and therefore do not allow an operator network to know what services it can effectively provide for a customer device belonging to this operator network, among the services desired by the user of this customer device.

SUMMARY

The present invention therefore concerns a method for determining a list of services for the user of a customer device belonging to an operator network, said operator network implementing the session control protocol SIP. Said method is remarkable in that it comprises the following steps:

said customer device inserts a list of services that it has the technical means to provide into a request for registration with the operator network, where appropriate, each intermediate network used for relating the customer device to the operator network transmits said request for registration to said operator network after having deleted therefrom or marked, in said list of services, all the services that said intermediate network does not have the technical means to provide and/or for which the intermediate network does not have a use agreement with the operator of the upstream and/or downstream network to which it is connected, and the operator network obtains a list, called a definitive list, by extracting from the list of services that is contained in the received request for registration those among them to which the user of the customer device is entitled, taking account of his subscription to the operator network, among the services that the operator network has the technical means to provide.

Thus, the present invention proposes the transmission, during a request for registration, of the list of available services between a customer device and its operator network, and the modification of this list, where appropriate, by the various SIP networks traversed. The operator network can thus acquaint itself with all of the services that are effectively available and authorized from end to end.

According to the particular features, said method then comprises the following steps:

said operator network inserts said definitive list into a response to said request for registration, and said response is transmitted, without modification of the definitive list, to said customer device via, where appropriate, said intermediate networks.

Owing to these provisions, the user of the customer device and, where appropriate, the intermediate networks are themselves also able to acquaint themselves with the list of services that this user can effectively access. Thus, during a subsequent service request (for example a request of SIP INVITE or SIP SUBSCRIBE type), the user of the customer device will advantageously limit himself to asking for the provision of the services chosen from those that he can effectively access.

Correlatively, the invention concerns a device for determining a list of services in an SIP network, called the first network, characterized in that it has means for:

receiving, from a customer device or from an SIP network, called the second network, to which said first network is connected, a request for registration with the operator network of said customer device containing a list of services, and modifying said list of services by deleting therefrom or marking, where appropriate, all the services that said first network does not have the technical means to provide and/or for which the operators of the first network and said second network have not set up a mutual use agreement.

According to particular features, said device furthermore has means for transmitting to an SIP network, called the third network, to which said first network is connected, said request for registration after having deleted therefrom or marked in said modified list, where appropriate, all of the services for which the operators of the first network and said third network have not set up a mutual use agreement.

According to another aspect, the invention concerns a session control server comprising a device as presented succinctly above. According to the same aspect, the invention concerns an interconnection server comprising a device as presented succinctly above.

The advantages provided by these devices and these servers are essentially the same as those provided by the correlative methods succinctly presented above.

It will be noted that it is possible to provide these devices within the context of software instructions and/or within the context of electronic circuits.

The invention is likewise aimed at a computer program downloadable from a communication network and/or stored on a computer-readable medium and/or executable by a microprocessor. This computer program is remarkable in that it comprises instructions for executing the steps of the method for determining a list of services that is succinctly presented above when it is executed on a computer.

The advantages provided by this computer program are essentially the same as those provided by said method.

BRIEF DESCRIPTION OF THE DRAWINGS

Other aspects and advantages of the invention will emerge upon reading the detailed description below of particular embodiments, which are given by way of nonlimiting example. The description refers to the accompanying figures, in which.

DETAILED DESCRIPTION OF ILLUSTRATIVE EMBODIMENTS

Although the present invention concerns SIP networks in general, consideration will now be given, by way of exemplary embodiment, of a network architecture of IMS type, as presented succinctly above. This architecture is illustrated in FIG. 2.

The multimedia services provided by this IMS network RO may comprise, by way of example, services of telephony, videotelephony, content sharing, presence, instant messaging or television. These services are available to the user of a customer device UE 10, which can use this network RO to exchange multimedia streams and session control signals compliant with the SIP protocol, notably with another customer device UE 11, the customer devices 10 and 11 having previously registered with the network RO.

The customer device 10, 11 may be a fixed or mobile terminal, or a home or company gateway, or else a piece of software on a PC or on a smartphone, having SIP signaling means and being able to comprise means for rendering an audiovisual content.

Figure 2:
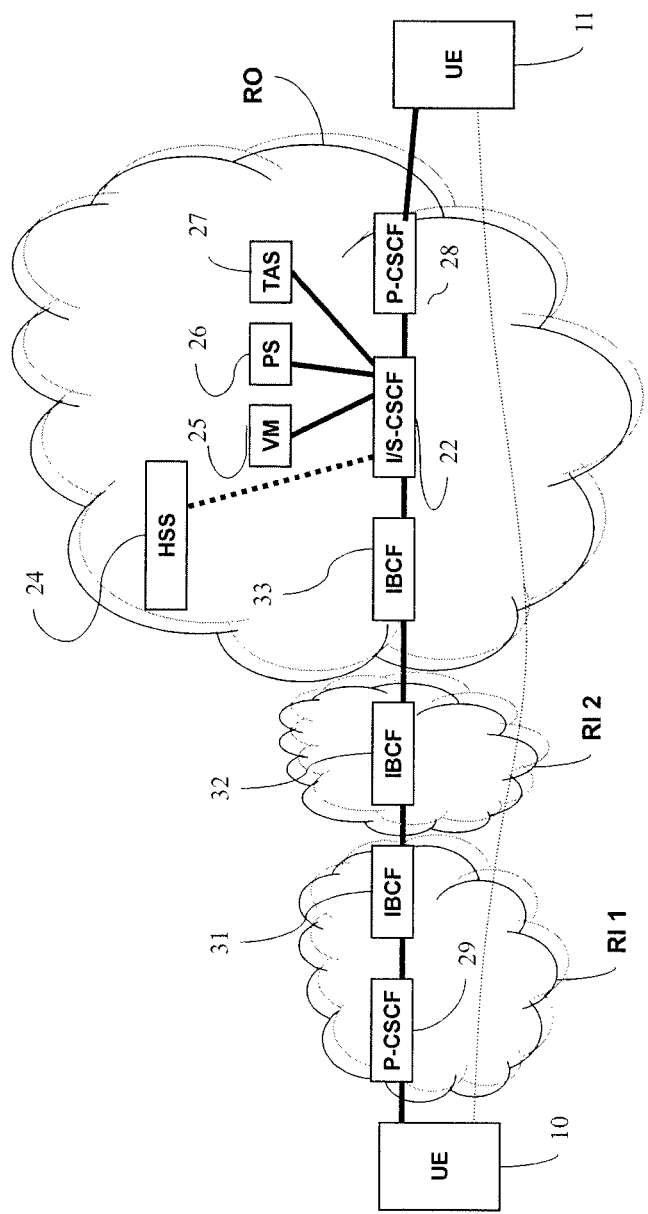

As FIG. 2 shows, this system for providing multimedia services is based on a network RO that is compliant with the IMS architecture defined by the 3GPP and that comprises:

an IP transport infrastructure (not shown);

one or more I/S-CSCF (for the combination of a function "Interrogating-Call Server Control Function" and a function "Serving-Call Server Control Function" in the same server) call servers; an I/S-CSCF call server 22 notably manages the registration procedure for the devices connected to the network RO; this is because in order for such a device to be able to make use of the services provided by this network, this device must, allowing for exceptions (in the event of certain emergency calls) register with the I/S-CSCF server 22; the I/S-CSCF server 22 likewise manages the routing of the signaling between the customer device 10 and the voice messaging VM 25, presence PS 26 and telephony TAS 27 servers, and the routing in the direction of other terminals managed by the same IMS network (such as the customer device 11, for example) and the routing of the signaling between this IMS network RO and other networks (not shown);

a (or a plurality of) P-CSCF (for "Proxy-Call Session Control Function") server(s); the P-CSCF 28 is the SIP point of contact of the customer device 11 in the IMS network RO; thus, all of the SIP signaling exchanged between the customer device 11 and the I/S-CSCF call server 22 passes through this P-CSCF server 28;

one or more database servers of HSS type, mentioned above; an HSS server 24 contains the profile of the user of the customer device 10 in terms of authentication, location and subscribed-to service data;

a (or a plurality of) IBCF servers 33; as mentioned above, the IBCF server 33 is situated on the border of the network IMS, and implements the specific processing operations that are required, where appropriate, for providing an interconnection (not shown) with another SIP network;

a (or a plurality of) voice messaging VM server(s) 25; the VM server 25 allows a voice message to be left by a caller such as the customer device 11 when the called customer device 10 is available to take the call;

a (or a plurality of) presence PS server(s) 26; the PS server 26 manages the subscription of the customer device 10 to the presence events that the user of this terminal wishes to monitor, and notifies the terminal when these events occur; and a (or a plurality of) telephony TAS server(s) 27; a TAS server manages the telephone services to which the user of the customer device 10 has subscribed with its operator, such as number presentation or call forwarding.

The voice messaging VM servers 25, the presence PS servers 26 and the telephony TAS servers 27 are examples of what are called "application servers" (AS in English).

The present invention concerns an SIP operator network RO and, where appropriate, the intermediate SIP network(s) (RI1, RI2, and so on) traversed by a request for registration that is sent by a customer device 10 to the operator network RO to which this customer device 10 belongs. At least one of these networks will advantageously be able to be a network of IMS type.

Figure 1:
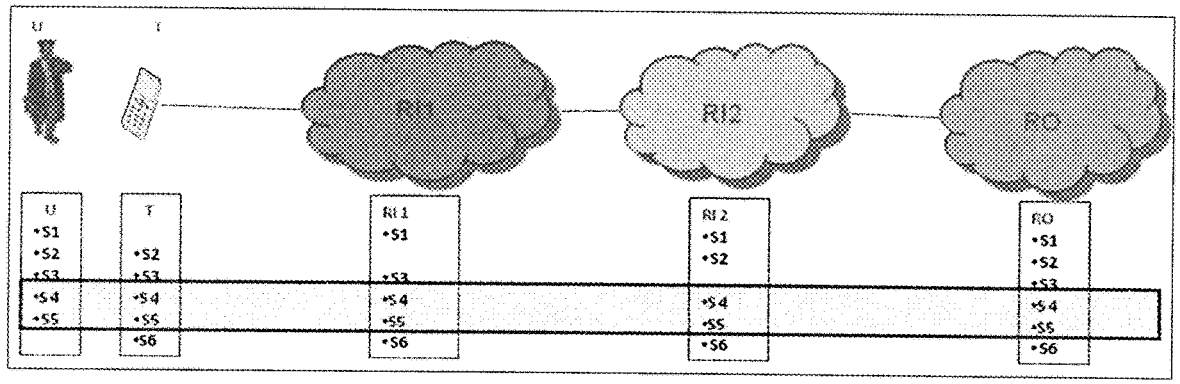
FIG. 1, which has already been described, shows the services that are accessible, according to the prior art, to a user connected to his operator network via two intermediate networks, FIG. 2 schematically shows the structure of an IMS network.
Figure 3:
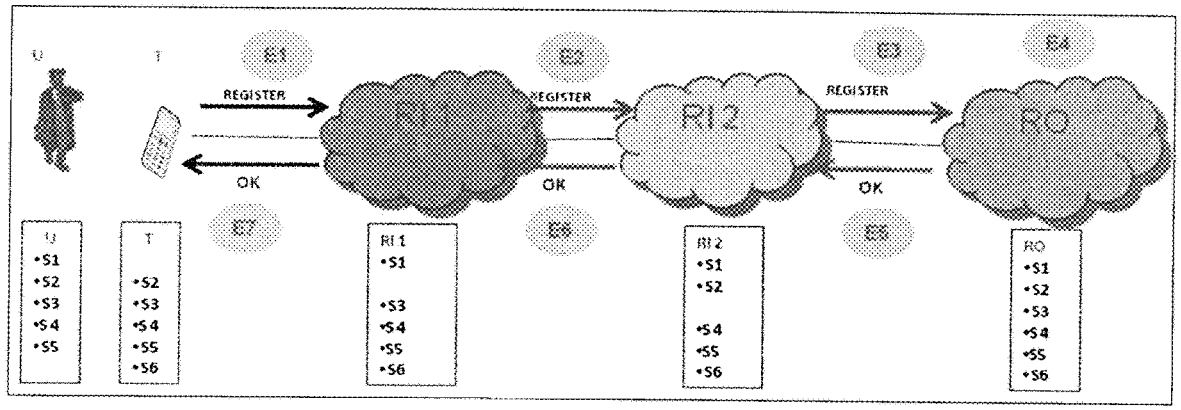
FIG. 3 shows, according to an embodiment of the invention, a method for determining the services that are effectively accessible to a user connected to his operator network via two intermediate networks.

An embodiment of the invention will now be described with reference to FIG. 2 and to FIG. 3. This FIG. 3 has been used to show a similar situation to the one described above with reference to FIG. 1, and similar denotations will be used below.

In a step E1, a customer device T, 10, initiates a registration procedure with its operator network RO. To do this, it sends a request for registration SIP REGISTER, and it inserts into the latter a list of services that it has the means to provide (and that the user U of the customer device T, 10, wishes to be able to use for as long as he remains registered).

In a step E2, this request for registration is received in an intermediate network RI 1 by a P-CSCF 29, which deletes from said list the services that the network RI 1 does not have the technical means to provide (the list of services that the network RI 1 has the means to provide being able to be configured statically in all the P-CSCF servers of the network RI 1, for example); as a variant, the intermediate network RI 1 can preserve the received list but add thereto an indication comprising its network identifier and those of the services with which it is not compatible; this second variant (presupposing that it is applied by all the intermediate networks) allows the operator network RO to have knowledge of the initial list requested by the customer device and to determine what particular intermediate network is at the origin of a particular restriction. The P-CSCF server 29 then transmits the request to an IBCF 31 of the network RI 1 providing the interconnection with an intermediate network RI 2 allowing the operator network RO to be joined. This IBCF 31 can in turn modify the list on the basis of the services negotiated with RI 2, for example by referring to a table providing, for each interconnecting network, the list of authorized services.

In a step E3, an IBCF server 32 (or a plurality of IBCF servers) of the network RI 2 reiterate(s) these very operations on the basis of the services that the network RI 2 has the means to provide, services negotiated with the network RI 1 and services negotiated with RO, before transmitting the request to an IBCF server 33 of the network RO. This IBCF server 33 can in turn modify the received list on the basis of the interconnection agreements between RO and RI 2, before transmitting the request to an I-CSCF server of RO.

In a step E4, this I-CSCF server, by means of the interrogation of the HSS 24, selects the S-CSCF that will manage the registration of the customer device T. This S-CSCF in turn modifies the list on the basis of the services that the operator network RO has the technical means to provide. Finally, the operator network RO obtains a list, called the definitive list, by extracting from the list of services obtained in this manner those among them to which the user U of the customer device T, 10, is entitled, taking account of his subscription with the operator network RO.

In a step E5, the operator network RO inserts this definitive list into a response 200 OK to the request REGISTER.

In steps E6 and E7, this response 200 OK is transmitted, without modification of the definitive list, to the customer device T, 10, via the intermediate networks RI2, then RI1.

On the whole, the set of steps E1 to E4 allows the operator network RO to acquire, within the list of services that the customer device T, 10, has the technical means to provide, those that are moreover compatible with the intermediate networks. The set of steps E5 to E7 allows the customer device T, 10, and possibly the intermediate networks, to themselves also find the list of services that are effectively accessible to this user U for as long as he remains registered.

According to particular features, it is possible, in order to implement the present invention, to extend the use, defined by the 3GPP, of the IMS service identifiers called "IMS Communication Service Identifiers" (ICSI). According to the 3GPP standard, these service identifiers are inserted by a customer device into an SIP request as parameters associated with the address of the customer device, and are conveyed without modification as far as the operator network, which reinserts them unchanged into its response 200 OK. The extension according to the present invention consists in allowing the intervention of the intermediate networks on this list of service identifiers, and in providing for the operator network RO to return to the customer device T, 10, the list of services that the latter can effectively access.

According to other particular features, new SIP headers dedicated to the determination of a list of services according to the invention (this list being able, in particular, to take the form of a list of ICSI identifiers) are defined; these new SIP headers will subsequently be denoted by "P-Requested-Services" and "P-Supported-Services". In this case, for example in the embodiment described above:

the customer device T, 10, inserts a header P-Requested-Services into the request SIP REGISTER with the list of services that it has the technical means to provide;

each intermediate network RI1, RI 2 relays this header by deleting therefrom or marking the identifiers of the incompatible services (on account of a technical inaptitude or an absence of ad hoc agreements);

the operator network RO compares the received list with the list of services to which the customer device T, 10, is entitled among the services that the operator network RO has the means to provide, and returns the common subset by means of the header P-Supported-Services of the 200 OK REGISTER; and the intermediate networks RI1, RI 2 relay this header without modifying it.

The invention can be implemented within the nodes, for example the session control servers or the interconnection servers, of SIP networks, by means of software and/or hardware components.

The software components will be able to be integrated into a conventional computer program for network node management. This is the reason, as indicated above, that the present invention likewise concerns a computer system. This computer system conventionally has a central processing unit using signals to control a memory, and an input unit and an output unit. Moreover, this computer system can be used to execute a computer program having instructions for implementing any one of the methods for determining a list of services according to the invention.

In fact, the invention also aims at a computer program downloadable from a communication network comprising instructions for executing the steps of a method for determining a list of services according to the invention when it is executed on a computer. This computer program may be stored on a computer-readable medium and may be executable by a microprocessor.

This program can use any programming language and be in the form of source code, object code or intermediate code between source code and object code, such as in a partially compiled form, or in any other desirable form.

The invention also aims at a computer-readable information storage medium having instructions from a computer program as mentioned above.

The information storage medium may be any entity or device that is capable of storing the program. For example, the medium may have a storage means, such as a ROM, for example a CD-ROM or a microelectronic circuit ROM, or else a magnetic recording means such as a hard disk, or else a USB key ("USB flash drive" in English).

On the other hand, the information storage medium may be a transmissible medium such as an electrical or optical signal, which can be conveyed via an electrical or optical cable, by radio or by other means. The computer program according to the invention may be downloaded on a network of Internet type, in particular.

As a variant, the information storage medium may be an integrated circuit that incorporates the program, the circuit being suited to executing or to being used in the execution of any one of the methods for determining a list of services according to the invention.

Although the present disclosure has been described with reference to one or more examples, workers skilled in the art will recognize that changes may be made in form and detail without departing from the scope of the disclosure and/or the appended claims.

The invention claimed is:

1. A method for providing network services according to a definitive list of the network services for a user of a customer device belonging to an operator network, the operator network implementing a session initiation protocol (SIP), wherein the method comprises:
   the customer device inserts an initial list of the network services that the customer device has the technical means to provide into a request for registration with the operator network and transmits the request for registration to the operator network through at least one intermediate network,
   each of the at least one intermediate network used for relating the customer device to the operator network receives the request for registration and transmits the request for registration toward the operator network after, where appropriate, having deleted therefrom or marked, in the initial list of the network services, all the network services that the at least one intermediate network does not have the technical means to provide or for which the at least one intermediate network does not have a use agreement with at least one of an operator of an upstream network or an operator of a downstream network to which the at least one intermediate network is connected, thereby transmitting the request for registration with a modified list of network services, and
   the operator network receives the request for registration, generates the definitive list by extracting from the modified list of the network services that is contained in the received request for registration those among them to which the user of the customer device is entitled, taking account of the user's subscription to the operator network, among the network services in the modified list that the operator network has the technical means to provide, and thereafter provides the network services to the customer device taking account of the definitive list.

2. The method as claimed in claim 1, wherein the initial list of the network services is inserted into a dedicated SIP header.

3. The method as claimed in claim 1, the method then comprises:
   the operator network inserts the definitive list into a response to the request for registration,
   the response is transmitted, without modification of the definitive list, to the customer device via the at least one intermediate network, and
   the customer device requests provision of a service taking account of the definitive list received with the response.

4. The method as claimed in claim 1, wherein the definitive list of the network services is constituted by a list of service identifiers "Internet Protocol Multimedia Subsystem (IMS) Communication Service Identifiers".

5. The method as claimed in claim 1, wherein the operator network is an Internet Protocol Multimedia Subsystem (IMS) network.

6. A method for providing network services according to a definitive list of the network services for a user of a customer device belonging to an operator network, the operator network implementing a session initiation protocol (SIP), wherein the method comprises:
   the customer device inserts an initial list of the network services that the customer device has the technical means to provide into a request for registration with the operator network and transmits the request for registration to the operator network through at least one intermediate network,
   each of the at least one intermediate network used for relating the customer device to the operator network receives the request for registration and transmits the request for registration toward the operator network after, where appropriate, having deleted therefrom or marked, in the initial list of the network services, all the network services that the at least one intermediate network does not have the technical means to provide or for which the at least one intermediate network does not have a use agreement with at least one of an operator of an upstream network or an operator of a downstream network to which the at least one intermediate network is connected, thereby transmitting the request for registration with a modified list of network services, the operator network receives the request for registration, generates the definitive list by extracting from the modified list of the network services that is contained in the received request for registration those among them to which the user of the customer device is entitled, taking account of the user's subscription to the operator network, among the network services in the modified list that the operator network has the technical means to provide, and thereafter provides the network services to the customer device taking account of the definitive list, the operator network inserts the definitive list into a dedicated SIP header of a response to the request for registration, the response is transmitted, without modification of the definitive list, to the customer device via the at least one intermediate network, and the customer device requests provision of a service taking account of the definitive list received with the response.

7. A device in a Session Initiation Protocol (SIP) network, called a first network, wherein the device comprises:

a non-transitory computer-readable medium comprising instructions stored thereon; and a processor configured by the instructions to perform acts comprising:

receiving, from a customer device or from another SIP network, called a second network, through which the first network is connected to the customer device, a request for registration with an operator network of the customer device to which the customer device is connected through the first network, the request for registration containing a list of network services in the SIP network, modifying the list of the network services by deleting therefrom or marking, where appropriate, all the network services in the list that the first network does not have the technical means to provide or for which operators of the first network and the second network have not set up a mutual use agreement, and transmitting the request for registration containing the modified list of the network services toward the operator network to enable the operator network to provide the network services to the customer device taking account of the modified list.

8. The device as claimed in claim 7, wherein the processor is configured further to transmit from the device to an SIP network, called a third network, to which the first network is connected, the request for registration after having deleted therefrom or marked in the modified list of the network services, where appropriate, all of the network services for which the operator of the first network and an operator of the third network have not set up a mutual use agreement.

9. The device as claimed in claim 7, wherein the first network is an Internet Protocol Multimedia Subsystem (IMS) network.

10. The device as claimed in claim 7, wherein the device is a session control server.

11. The device as claimed in claim 7, wherein the device is an interconnection server.

12. At least one non-transmissible computer-readable medium comprising instructions stored thereon for executing a method for providing network services according to a definitive list of the network services for a user of a customer device belonging to an operator network, when executed by at least one processor, the operator network implementing a session initiation protocol (SIP) and wherein the method comprises:

the customer device inserts an initial list of the network services that the customer device has the technical means to provide into a request for registration with the operator network and transmits the request for registration to the operator network through at least one intermediate network, each of the at least one intermediate network used for relating the customer device to the operator network receives the request for registration and transmits the request for registration toward the operator network after, where appropriate, having deleted therefrom or marked, in the initial list of the network services, all the network services that the at least one intermediate network does not have the technical means to provide or for which the at least one intermediate network does not have a use agreement with at least one of an operator of an upstream network or an operator of a downstream network to which the at least one intermediate network is connected, thereby transmitting the request for registration with a modified list of the network services, and the operator network receives the request for registration, generates the definitive list by extracting from the modified list of the network services that is contained in the received request for registration those among them to which the user of the customer device is entitled, taking account of the user's subscription to the operator network, among the network services in the modified list that the operator network has the technical means to provide, and thereafter provides the network services to the customer device taking account of the definitive list.

* * * * *